C. G. GILBERG.
DEVICE FOR AIDING WOUNDED OR INJURED PERSONS.
APPLICATION FILED JULY 5, 1917.
1,252,260.
Patented Jan. 1, 1918.
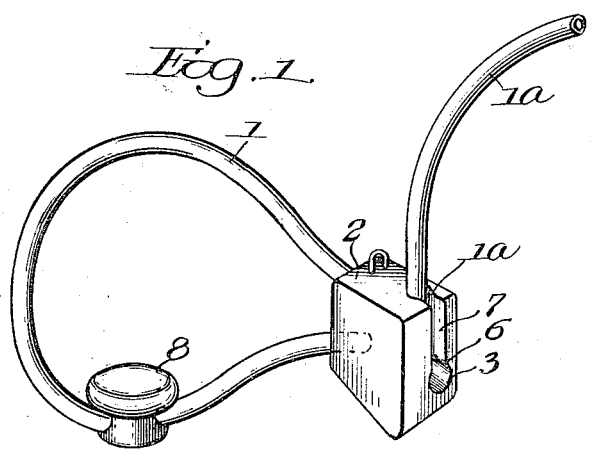
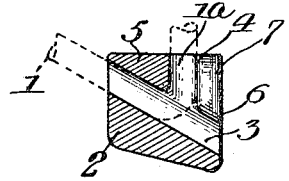
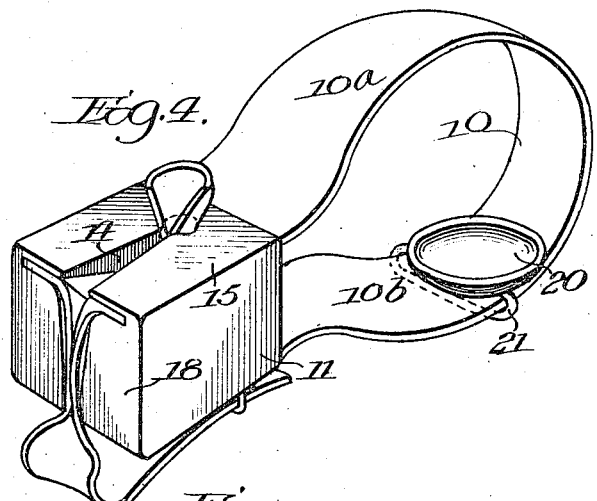
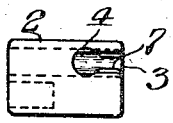
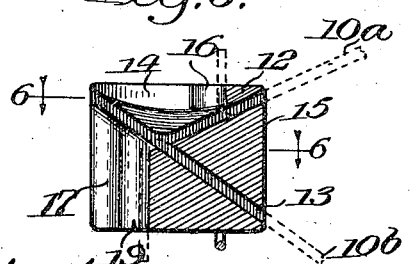
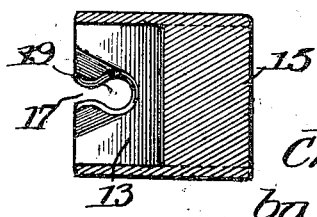
Inventor
Charles G. Gilberg
by H. Miller Reghes Atty.

UNITED STATES PATENT OFFICE.

CHARLES GURTAPE GILBERG, OF ROCKFORD, ILLINOIS.

DEVICE FOR AIDING WOUNDED OR INJURED PERSONS.

1,252,260.  Specification of Letters Patent.  Patented Jan. 1, 1918.

Application filed July 5, 1917. Serial No. 178,811.

*To all whom it may concern:*

Be it known that I, CHARLES GURTAPE GILBERG, citizen of the United States, residing at Rockford, in the county of Winnebago and State of Illinois, have invented a certain new and useful Improvement in Devices for Aiding Wounded or Injured Persons, of which the following is a full, clear, concise, and exact description, reference being had to the accompanying drawings, forming a part of this specification.

My invention relates to devices for rendering first aid to injured or wounded persons.

The principal object of the invention is to provide a device by which a wound or injury can be temporarily treated in a very quick and efficient manner.

In carrying out the invention a band or strip of suitable material is provided, together with a fastening device by which said band or strip may be instantly caught or fastened at any desired point. The band or strip may be of flexible material such, for example, as a rubber tube and the fastening device may be firmly secured to one end of said tube and mounted to slide upon the length thereof and provided with means by which it may be caught or twisted to fasten it at any desired point. Thus, in case an arm or limb is injured, the band or strip may be placed about the same and then the fastening device caught so as to hold the strip in position where it is placed. The band or strip may be drawn as tightly as desired and instantly caught so that the aid in stopping the flow of blood or otherwise may be rendered instantly. If desired a pressure device, such as a rubber button, may be slidably mounted upon the band or strip so that when the latter is placed and drawn in position, the button may be moved or slide to any desired point and placed upon an artery or vein or otherwise disposed.

In the accompanying drawings:

Figure 1 is a perspective view of a device embodying my invention;

Fig. 2 is a cross section of the fastening device of the same;

Fig. 3 is a plan view of the fastening device shown in Fig. 2;

Fig. 4 is a perspective view of a modified form of device;

Fig. 5 is a cross section of the fastening device thereof, and

Fig. 6 is a section taken on line 6—6 of Fig. 5.

As shown in the drawings, the device may consist of a band or strip 1, which in the arrangement of Fig. 1 is preferably made of a length of rubber tube such as is commonly used in pneumatic musical instruments or like devices. At one end of this tube 1 a fastening device 2 is secured. This consists of a piece or block of wood having an aperture into which an end of the tube section 1 is inserted and secured. Said block 2 is also provided with a channel or aperture 3 extending from side to side of the block, as shown in Fig. 2, and also with a short cross channel 4 extending from the channel 3 to the surface 5 and opening to the surface 6 by means of a slot 7 of less width than said channel 4. Thus the tube 2 may slide readily through the channel or duct 3 but may be drawn up through the slot 7 into the position shown in Figs. 1 and 2 in which position it will be firmly held, thereby permitting said band or tube section 1 to form a loop of any desired size. A pressure device such as the button 8, which may be made of rubber or other suitable material, is preferably mounted for sliding movement upon the tube 1. Thus in operation the device may be applied to the hand or limb of an injured person and by pulling upon the end 1$^a$ of the tube section 1 the latter may be drawn as tight as desired. Then the section 1 is bent or doubled partly back so as to catch it in the slot 7 and channel 4, thereby engaging and holding it firmly in the desired position. The button 8 may be adjusted to any desired location to press upon an artery or vein or otherwise.

In the arrangement shown in Fig. 4 I show a band 10 preferably made of a flat strip of leather and a fastening block or piece 11. The latter is provided with two slots 12 and 13 into which the opposite ends of the strip 10 may pass, said slots being of such size as to permit of free movement of the ends of said strip therein. A wedge-shaped slot 14 is provided in the top surface 15 of said block 11 and terminates in an aperture 16. A second slot 17 is formed in the side surface 18 and terminates in an aperture 19. Thus the upper end 10$^a$ of the strip 10 may be passed into the slot 12 and thence into and out of the left hand end of the slot 13, and the lower end 10$^b$ of the strip 10 may be passed into the lower right hand end of the slot 13 and thence also into and out of the left hand end of said slot 13.

This permits the sliding adjustment of both ends of the strip 10 with the block 11. The upper end 10ª may be pulled back in the slot 14 so as to engage it with that slot and the lower strip 10ᵇ may be pulled down into the slot 17 and more or less into the aperture 19. In this way either one or both of the ends of the strip 10 may be firmly fastened in a detachable manner to the block 11 so that the band 10 may also be placed around an injured part and then drawn to as tight a condition as desired and then instantly engaged so as to hold it in such condition.

A button 20 is preferably mounted on the band 10 as by means of a metal loop 21. This button may be adjusted and applied as described in connection with the arrangement of Fig. 1.

It will be understood that changes and modifications may be made without departing from the spirit of the invention.

What I claim is:

1. A device of the class specified comprising a band or strip and a fastening device having an aperture through which said band or strip may slide, and also having a supplemental associated recess into which a portion of the band or strip adjacent to that in said aperture may be introduced and held, said recess being so located that when said portion of the band or strip is within it, said portion will be at an angle to the adjacent portion in said aperture.

2. A device of the class specified comprising a band or strip, and a fastening device therefor, said fastening device having apertures in which the opposite ends of said band or strip may slide, and also having associated recesses in which adjacent portions of said band or strip may be inserted and by which the same may be held at an angle to the portions thereof in said apertures.

In witness whereof, I hereunto subscribe my name this twentieth day of June, A. D. 1917.

CHARLES GURT GILBERG.

Witnesses:
C. V. LYONS,
ERIC A. JOHNSON.

Copies of this patent may be obtained for five cents each, by addressing the "Commissioner of Patents, Washington, D. C."